Dec. 8, 1959  H. HEMFORT ET AL  2,916,201
CENTRIFUGE DRIVE SPINDLE ARRANGEMENT
Filed Feb. 21, 1956  2 Sheets-Sheet 1

INVENTOR.
HEINRICH HEMFORT
BY
ATTORNEYS

INVENTOR.
HEINRICH HEMFORT

United States Patent Office
2,916,201
Patented Dec. 8, 1959

2,916,201

CENTRIFUGE DRIVE SPINDLE ARRANGEMENT

Heinrich Hemfort and Hugo Zurbrüggen, Oelde, Westfalia, Germany, assignors to Westfalia Separator A.G., Oelde, Westfalia, Germany, a corporation of Germany Application February 21, 1956, Serial No. 566,909

14 Claims. (Cl. 233—23)

This invention relates to an improved centrifuge drive spindle arrangement.

Centrifuges having a vertical axis of rotation of the centrifugal bowl are well known. These centrifuges generally have the centrifugal bowl mounted on a vertical drive spindle which is rotatably supported in the centrifuge frame by means of an upper radial or top bearing and a lower radial bearing, which are generally of the ball or roller type. The upper radial bearing is generally subjected to severe lateral or radial stresses during the operation of the centrifuge, caused by unbalance of the centrifugal bowl.

In order to withstand these stresses and provide the necessary give, the upper radial bearing is generally resiliently connected to the centrifuge frame, so as to allow a limited lateral or radial movement. The outer bearing shell of the upper radial bearing may, for example, be surrounded by a pressure ring which is connected to the centrifuge frame through a star-shaped spring arrangement.

The over-all radial movement of the drive spindle during operation of the centrifuge is generally in the form of a pivotal or pendulum-like movement with the point of pivot being approximately at the lower radial bearing. The lower radial bearing therefore must have some give to allow this pivotal movement if overstressing is to be avoided. The degree of pivotal movement at the lower radial bearing is dependent upon the distance between the upper and lower radial bearings with the movement at the lower radial bearing decreasing with an increase in the length between the two bearings.

In order to allow the necessary pivotal movement of the drive spindle in the lower radial bearing, the same is generally developed as a swing or self-aligning bearing, as, for example, a ball bearing, provided with a concave-shaped outer bearing shell, which allows a sliding of the balls on the concave race of this shell upon radial movement of the drive spindle. The drive spindle of the centrifuges, and particularly in the case of larger centrifuges, is provided with a support thrust bearing which supports the weight of the centrifuge bowl and of the spindle. The thrust bearing generally rests on a pressure plate, which may be provided with a central bore on its bottom, into which a compression spring may be fitted in order to equalize the axial swinging motions of the spindle. By screwing a threaded member into the housing of the thrust bearing, the pressure plate and compression spring are held together and pressed against the lower end of the spindle. In this manner the drive spindle, together with the centrifugal bowl, may be axially displaced in order, for example, to obtain an exact adjustment of the height of the centrifugal bowl, which is of particular importance in connection with centrifuges provided with stripping or peeling discs.

This conventional mounting of the vertical centrifuge drive spindle, however, has certain disadvantages. With the swinging or pivotal motion of the lower spindle end being taken up by the lower radial bearing itself, the bearing is subject to wear and the bearing shells and housing may become damaged after a period of time. In order to replace the damaged lower bearing assembly, the same must be removed, which entails certain difficulties, since the same frequently must be knocked off, due to its tight seat. Since centrifuges are often permanently mounted, it is then necessary to remove the centrifuge from its foundation. This is very inconvenient, time-consuming, and expensive, particularly in locations where there is lack of space, as, for example, on ships. Furthermore, in the removal of the centrifuge, the feed and discharge lines must be disconnected, and during the subsequent assembly of the centrifuge, an accurate adjustment with respect to the spindle height must be made.

One object of this invention is a novel drive spindle arrangement for a centrifuge, which eliminates the above-mentioned disadvantages. This, and still further objects, will become apparent from the following description, read in conjunction with the drawings, in which.

In accordance with the invention, the vertical drive spindle of the centrifuge is rotatably mounted in a rigid sleeve member, which is removably connected to the centrifuge frame for removal therefrom with the drive spindle as a unit. The sleeve member is preferably resiliently connected to the centrifuge frame for limited radial movement, as, for example, limited pivotal motion or limited pendulum-like motion about a pivot point at the lower end portion of the sleeve member.

The sleeve member, preferably surrounds a substantial portion of the length of the drive spindle with the drive spindle rotatably mounted in the sleeve member on an upper radial bearing connected to the upper portion of the sleeve member, a lower radial bearing connected to the lower portion of the sleeve member, and a lower supporting thrust bearing connected to the lower portion of the sleeve member. The lower radial bearing need not be a self-aligning bearing, but may be an ordinary radial bearing, and the mounting of all of the parts can be effected outside the centrifuge.

The sleeve member containing the bearings and the rotatably mounted drive spindle is therefore in the form of an integral unit, which may be easily removed and replaced in the centrifuge. In cases of imbalance of the bowl, the spindle no longer oscillates by itself, but the entire unit, i.e., the sleeve member and connected parts effect this radial or pendulum-like motion.

By the arrangement in accordance with the invention, the stresses of these radial pendulum-like motions are transferred from the rotating parts to non-rotating parts. Damage caused by these movements in the bearings are therefore initially avoided. The assembly can be removed from the centrifuge frame, after lifting off the bowl and loosening a few screws. A readjustment of the height of the spindle after reassembly is no longer necessary. Due to the fact that the sleeve member swings together with the spindle, the gap between the top bearing spindle cap and a guide ring screwed into the sleeve can be constructed so as to be very small, as a result of which the penetration of injurious gases and vapors is extensively prevented. If the upper ball bearing becomes damaged during operation, this guide ring can serve for a short time as a plain bearing and therefore prevent greater damage to the device.

The invention will be described in further detail with reference to the embodiments shown in the accompanying drawing.

Figures 1, 2:
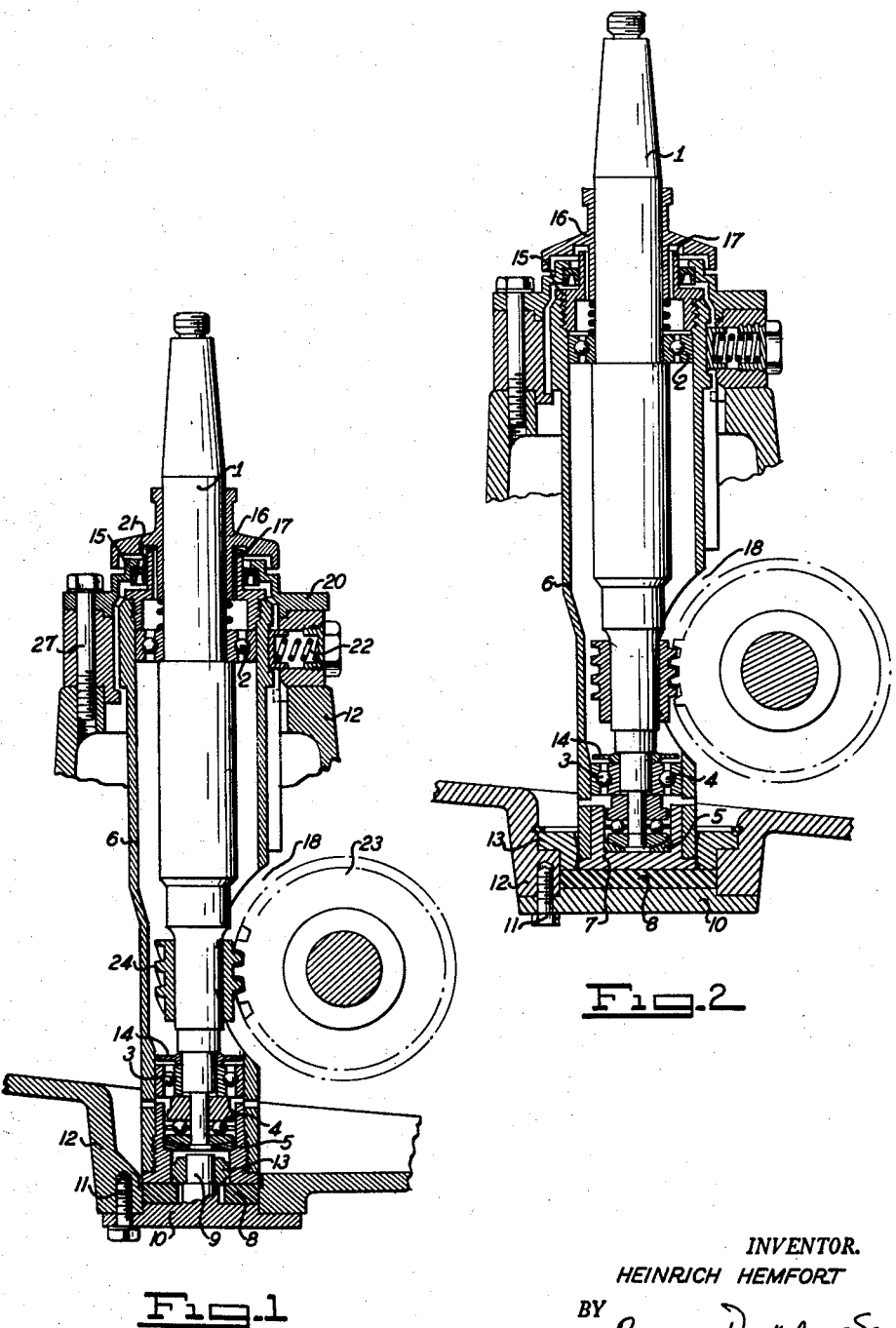
Fig. 1 is a vertical section of an embodiment of a drive spindle arrangement in accordance with the invention.
Fig. 2 is a vertical section of a further embodiment of a vertical drive spindle arrangement for a centrifuge in accordance with the invention.

In the embodiment as shown in Fig. 1, the drive spindle 1 of the centrifuge is rotatably mounted in the rigid sleeve member 6 by means of the upper radial ball bearing 2, the lower radial ball bearing 3, and the support thrust bearing 4.

The sleeve member 6 extends over a substantial portion of the length of the drive spindle 1, and the bearing 2 is positioned at the upper end portion of the sleeve member 6, while the bearings 3 and 4 are positioned at the lower end portion of this member. The thrust bearing 4, which supports the weight of the spindle and the centrifuge drum connected thereto, is positioned on the lower pressure plate 5, which is maintained in position by the bushing 7, which is screwed into the sleeve member 6. A ring 14 covers the bearing 3.

The entire sleeve member 6 and its assembly rests on a closure plate 10, which is screwed by means of the screws 11 into the base 12 of the centrifuge frame. The closure plate 10 has a centrally positioned pin 9 and an annular washer 8, constructed of an elastic material, of, for example, rubber, neoprene, plastic, or the like. The self-aligning bearing ring 13 is positioned around the pin 9. The self-aligning bearing ring has a convex or barrel-shaped outer surface, or an outer surface with beveled edges, or the like. The self-aligning bearing and bushing 13 may be constructed of metal or any other desired material, as, for example, plastic. The sleeve member 6 is positioned over this self-aligning bearing member 13, so that the inner surface of the bushing 7 is in contact therewith, and so that the edge of the sleeve defined by the edge of the bushing 7 rests on the resilient annular ring 8.

A bushing 15 is screwed into the upper end of the sleeve member 6. A cap member 16 is fitted around the spindle 1 and extends into the bushing 15 to form a very narrow annular gap 17 therebetween. The cap member 16 also has a lateral extension which forms more or less a labyrinth-type seal with the bushing 15 and the cover plate 20, which is connected to the centrifuge frame. The cover plate 20 is connected to the bushing 15 by means of a resilient rubber gasket 21. The sleeve member 6 is maintained centrally positioned in the opening of the cover plate 20 by means of the pressure springs 22, distributed about the periphery. Thus, for example, three pressure springs 22 may be equidistantly positioned around the periphery of the sleeve member and secured to the centrifuge frame. The sleeve member 6 has a cut-out portion 18, so that the drive gear 23 can engage the worm gear 24 of the drive spindle in the conventional manner. So that the drive gear 23 will not prevent the removal of the sleeve member 6, the bottom portion of the centrifuge frame is so developed that the side of the sleeve member opposite the drive gear 23 may be slid away from the drive gear for disengagement of the drive gear 23 and worm 24.

In all other respects the construction and operation of the centrifuge is conventional with the other portions of the centrifuge being omitted for clarity and simplification.

In operation, as the drive gear drives the worm 24 and the spindle 1 with the centrifugal bowl attached thereto, the imbalance of the bowl may cause a pendulum-like movement, i.e., a limited lateral movement of the sleeve member 6, and all its connected parts about the self-aligning bearing 13 as pivot point. This pivotal motion is further allowed by the resilient ring 8, which forms the base for the sleeve member. The lateral movement at the upper end where the same is greatest, is allowed by the resilience of the gasket 21 and the spring 22. As may be noted, there is no movement of the rotating parts with respect to each other. The gap 17 may be made extremely small, so that the penetration of injurious gases and vapors is effectively prevented, further protecting the bearings. Should, for example, the bearing 2 fail, the bushing 15 in conjunction with cap 16 will effectively act as a plain bearing, preventing extensive damage to the centrifuge and its parts.

In order to remove the unit consisting of the sleeve member 6 and drive spindle 1 and the various connecting bearings, etc., it is merely necessary to remove the screws 27, remove the pressure springs 22 by which the sleeve member 6 is centrally maintained in the opening of the cover plate 20, lift off the cover plate 20, and lift the entire unit, while swinging the bottom portion of the sleeve member 6 away from the drive gear 23 and disengage this gear from the worm 24. The whole unit may then be easily removed for repair, replacement, or the like. For reinsertion, the unit is replaced in exactly the reverse manner.

The embodiment as shown in Fig. 2 is identical in all respects to that shown in Fig. 1, except that in place of the pin 9 and inner self-aligning bearing 13, an outer ring-type self-aligning bearing 13 is provided, which engages the outer surface of the bottom portion of the sleeve member 6. In this embodiment the supporting member 8 instead of being in the form of a ring, may be in the form of a plate or disc.

Figure 3:
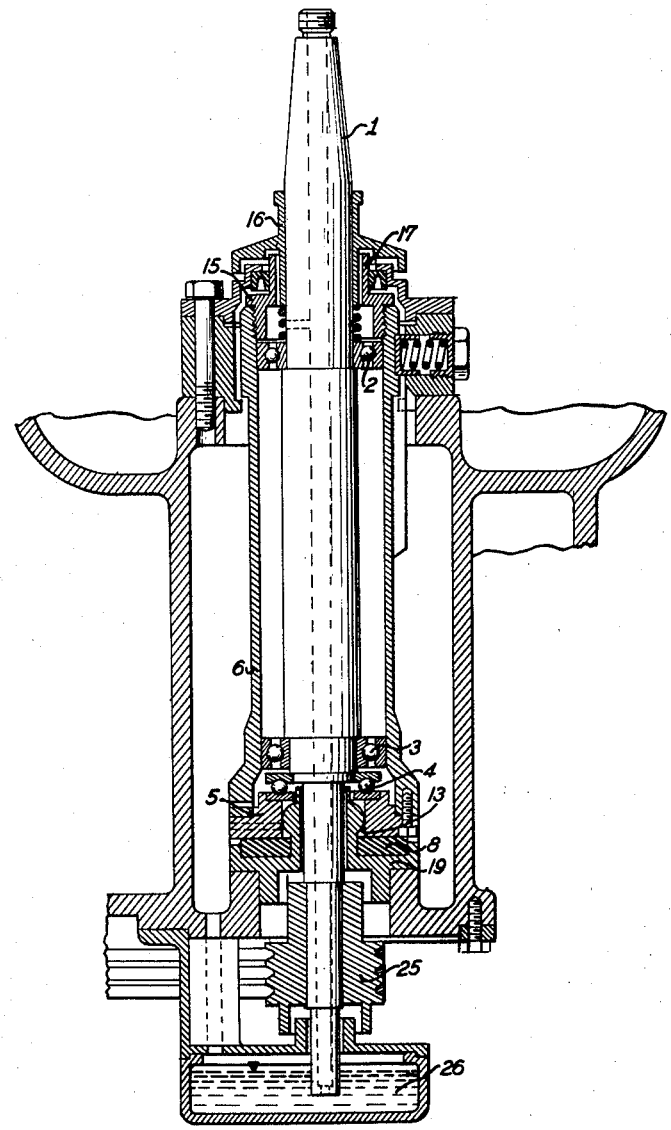
Fig. 3 is a vertical section of a still further embodiment of a drive spindle arrangement in accordance with the invention, in which the drive spindle is provided with a drive belt pulley at its lower end.

The embodiment as shown in Fig. 3 is for use in conjunction with a centrifuge, which, in place of the drive gear 23 and worm 24, has a drive gear or pulley at the lower end of the drive spindle. As shown, the drive spindle 1 extends through the sleeve member 6, the lower bearing arrangements, out through the bottom of the centrifuge frame and terminates in the oil reservoir 26. A drive-belt pulley 25 is connected to the portion of the drive spindle 1, extending below the centrifuge frame. The embodiment and construction and operation in all other respects are identical with the embodiment shown in Fig. 1, except that the self-aligning bearing 13 is formed integral with the part 19, which is secured to the centrifuge frame.

While the invention has been described in detail with reference to the specific embodiment shown, various changes and modifications will become apparent to the artisan as falling within the spirit of the invention and the scope of the appended claims.

We claim:

1. In an indirectly driven centrifuge having a vertical drive spindle with the drive spindle rotatably mounted on an upper radial bearing connected to the upper portion of said drive spindle, a lower radial bearing connected to the lower portion of said drive spindle and a lower supporting thrust bearing connected to the lower portion of said drive spindle, the improvement which comprises that the spindle, the upper and lower radial bearings and the lower supporting thrust bearing are all assembled in a rigid sleeve member surrounding a substantial length of said drive spindle, said sleeve member being mounted at its lower end on a resilient base member and is maintained in axial position by a self-aligning bearing allowing limited pivotal movement with respect thereto and being removably connected to the centrifuge frame for removal therefrom with said drive spindle as a single replaceable unit.

2. Improvement according to claim 1, in which said self-aligning bearing extends into the interior of the bottom portion of said sleeve member.

3. Improvement according to claim 1, in which said self-aligning bearing is a ring bearing surrounding the outer surface of the bottom portion of said sleeve member.

4. In an indirectly driven centrifuge having a frame and a vertical drive spindle, the improvement which comprises a rigid sleeve member surrounding a substantial portion of the length of said drive spindle, said drive spindle being rotatably mounted in said rigid sleeve member on an upper radial bearing connected to the upper portion of said sleeve member, a lower radial bearing connected to the lower portion of said sleeve member, and a lower supporting thrust bearing connected to the lower portion of said sleeve member, said sleeve member being mounted at its lower end on a resilient base member, and a self-aligning bearing allowing limited pivotal motion about said self-aligning bearing, and being removably connected to the centrifugal frame for removal therefrom with said drive spindle as a unit.

5. Improvement according to claim 4, in which the upper portion of said sleeve member has a bushing connected thereto, and including a cap member connected to the upper portion of said spindle extending within said bushing forming a narrow, annular clearance therebetween.

6. Improvement according to claim 4, including spring means resiliently maintaining the upper portion of said sleeve member in vertical alignment.

7. Improvement according to claim 4, including a worm gear mounted on said drive spindle within said sleeve member, a cut-out defined in said sleeve member adjacent said worm gear and a centrifuge drive gear extending in said cut-out in engagement with said worm gear.

8. Improvement according to claim 4, in which the lower end of said drive spindle extends through said resilient base member.

9. Improvement according to claim 8, including a drive pulley mounted on the lower extension of said drive spindle.

10. A vertical drive spindle arrangement for an indirectly driven centrifuge comprising a drive spindle, a rigid sleeve member surrounding a substantial portion of the length of said drive spindle, said drive spindle being rotatably mounted as a unit in said sleeve member on an upper radial bearing connected to the upper portion of said sleeve member, a lower radial bearing connected to the lower portion of said sleeve member, and a lower supporting thrust bearing connected to the lower portion of said sleeve member said sleeve member being mounted at its lower end on a resilient base member, and a self-aligning bearing allowing limited pivotal motion about said self-aligning bearing, and being removably connected to the centrifugal frame for removal therefrom with said drive spindle as a unit.

11. Drive spindle arrangement according to claim 10, including a bushing connected to the upper end portion of said sleeve member, and a cap member connected to the upper portion of said drive spindle extending within said bushing and defining a narrow annular clearance therebetween.

12. Drive spindle arrangement according to claim 10, including a worm gear mounted on said drive spindle within said sleeve member, and a cut-out defined through said sleeve member adjacent said worm gear.

13. Drive spindle arrangement according to claim 10, in which the drive spindle extends past the lower end portion of said sleeve member through said thrust bearing.

14. Drive spindle arrangement according to claim 13, including a drive pulley connected to the lower extended end of said drive shaft.

References Cited in the file of this patent

UNITED STATES PATENTS

| | | |
|---|---|---|
| 1,174,955 | Balzer | Mar. 14, 1916 |
| 1,876,656 | Forsberg | Sept. 13, 1932 |
| 2,534,738 | Scott | Dec. 19, 1950 |

FOREIGN PATENTS

| | | |
|---|---|---|
| 344,224 | Great Britain | Mar. 5, 1931 |